United States Patent
Tesanovic et al.

(10) Patent No.: US 9,363,678 B2
(45) Date of Patent: Jun. 7, 2016

(54) WIRELESS COMMUNICATION SYSTEM

(71) Applicant: FUJITSU LIMITED, Kawasaki-shi, Kanagawa (JP)

(72) Inventors: Milos Tesanovic, Harrow (GB); Paul Bucknell, Brighton (GB); Hind Chebbo, Uxbridge Middlesex (GB)

(73) Assignee: FUJITSU LIMITED, Kawasaki (JP)

( * ) Notice: Subject to any disclaimer, the term of this patent is extended or adjusted under 35 U.S.C. 154(b) by 128 days.

(21) Appl. No.: 14/205,701

(22) Filed: Mar. 12, 2014

(65) Prior Publication Data
US 2014/0295827 A1 Oct. 2, 2014

(30) Foreign Application Priority Data
Mar. 28, 2013 (EP) .................................... 13161686

(51) Int. Cl.
*H04W 52/24* (2009.01)
*H04W 16/06* (2009.01)
(Continued)

(52) U.S. Cl.
CPC .............. *H04W 16/06* (2013.01); *H04W 16/00* (2013.01); *H04W 16/08* (2013.01); *H04W 36/0061* (2013.01); *H04W 72/048* (2013.01); *H04W 76/023* (2013.01); *H04W 88/04* (2013.01)

(58) Field of Classification Search
CPC ..... H04W 36/00; H04W 16/06; H04W 72/04; H04W 76/02; H04W 88/06; H04W 88/16; H04W 48/16; H04W 8/00; H04W 76/023; H04W 8/005; H04W 52/24; H04B 7/00; H04B 7/14; H04M 1/00
USPC ............. 455/16, 426.1, 436, 517, 522, 552.1, 455/561, 444, 449, 41.1–41.3, 434
See application file for complete search history.

(56) References Cited

U.S. PATENT DOCUMENTS

2006/0246887 A1* 11/2006 Barclay ................. H04W 24/00 455/423
2007/0010196 A1* 1/2007 Periyalwar ............. H04B 7/026 455/7

(Continued)

FOREIGN PATENT DOCUMENTS

| EP | 1729533 | 12/2006 |
|----|---------|---------|
| EP | 2018073 | 1/2009 |
| WO | 2008090049 | 7/2008 |

OTHER PUBLICATIONS

Extended European search report issued for corresponding European application No. 13161686A, dated Sep. 13, 2013.

(Continued)

*Primary Examiner* — Allahyar Kasraian
*Assistant Examiner* — B. M. M Hannan
(74) *Attorney, Agent, or Firm* — Myers Wolin, LLC

(57) ABSTRACT

A method of operating a wireless communication system comprising one or more base stations each configured to provide a corresponding coverage in use, a particular one of the base stations providing coverage to one or more in-coverage terminals, there being one or more out-of-coverage terminals outside the coverage provided by the particular base station, the method comprising: determining whether a condition related to direct device-to-device wireless communication between the in-coverage terminals and the out-of-coverage terminals is satisfied; and if the condition is satisfied, changing at least one of the coverage of the particular base station and the coverage of another one of the base stations, so as to provide coverage to one or more of the out-of-coverage terminals.

13 Claims, 8 Drawing Sheets

(51) Int. Cl.
*H04W 16/00* (2009.01)
*H04W 16/08* (2009.01)
*H04W 88/04* (2009.01)
*H04W 36/00* (2009.01)
*H04W 72/04* (2009.01)
*H04W 76/02* (2009.01)
*H04B 7/00* (2006.01)

(56) References Cited

U.S. PATENT DOCUMENTS

| | | | |
|---|---|---|---|
| 2010/0279647 A1* | 11/2010 | Jacobs | H04W 4/22 455/404.1 |
| 2011/0038284 A1* | 2/2011 | Senarath | H04B 7/155 370/279 |
| 2012/0157146 A1 | 6/2012 | Theisen et al. | |
| 2013/0183963 A1* | 7/2013 | Turtinen | H04W 36/0083 455/426.1 |
| 2014/0036793 A1* | 2/2014 | Johnsson | H04W 24/04 370/329 |
| 2014/0094180 A1* | 4/2014 | Zhou | H04W 40/30 455/445 |
| 2014/0098731 A1* | 4/2014 | Maaref | H04W 72/121 370/312 |
| 2014/0106737 A1* | 4/2014 | Wilhelmsson | H04B 7/15557 455/422.1 |
| 2015/0031353 A1* | 1/2015 | Hakola | H04W 48/16 455/422.1 |
| 2015/0043438 A1* | 2/2015 | Fwu | H04W 28/24 370/329 |
| 2015/0215977 A1* | 7/2015 | Yamazaki | H04W 4/08 455/452.1 |

OTHER PUBLICATIONS

3GPP TR 22.803 V12.0.0; 3rd Generation Partnership Project; Technical Specification Group Services and System Aspects; "Feasibility study for Proximity Services (ProSe) (Release 12)"; Dec. 2012.

* cited by examiner

WIRELESS COMMUNICATION SYSTEM

CROSS-REFERENCE TO RELATED APPLICATIONS

This is a continuation of European Patent Application No. 13161686.4, filed on Mar. 28, 2013, now pending, the contents of which are herein wholly incorporated by reference.

FIELD

Embodiments of the present application relate generally to wireless communication systems and in particular, but not exclusively, to managing coverage provided by base stations of such wireless communication systems.

BACKGROUND

Wireless communication systems are widely known in which base stations (or access points) communicate wirelessly with terminals (also called user equipments, mobile stations or subscriber stations) within range of the base stations. The geographical area covered by a base station is generally referred to as a cell, and typically many base stations are provided in appropriate locations so as to cover a wider geographical area more or less seamlessly with adjacent and/or overlapping cells. The size of a cell can be influenced by a number of factors including transmission power, pathloss, interference, and the like. A terminal may be in range of (i.e. be able to directly communicate with) several base stations at the same time, but in the simplest case the terminal communicates with one 'serving' base station.

Although a great deal of effort is focused on coverage planning for wireless communication systems in order to achieve optimal placement of the base stations, there is a need for improved techniques for managing coverage provided by existing base stations of wireless communication systems.

SUMMARY

In one embodiment, there is provided a method of operating a wireless communication system comprising one or more base stations each configured to provide a corresponding coverage in use, a particular one of the base stations providing coverage to one or more in-coverage terminals, there being one or more out-of-coverage terminals outside the coverage provided by the particular base station, the method comprising determining whether a condition related to direct device-to-device wireless communication between the in-coverage terminals and the out-of-coverage terminals is satisfied; and if the condition is satisfied, changing at least one of the coverage of the particular base station and the coverage of another one of the base stations, so as to provide coverage to one or more of the out-of-coverage terminals.

By using a condition related to direct device-to-device wireless communication between in-coverage and out-of-coverage terminals, coverage provided by existing infrastructure resources can be effectively managed.

The wireless communication system may comprise infrastructure resources of multiple wireless communication systems (or networks). For example, the wireless communication system may comprise a mix of LTE cellular base stations and WiFi base stations (access points).

The term "coverage" or "coverage area" is used herein to denote a communication capability between a base station and a terminal, whether direct or via a relay terminal. The communication capability may be specified, for example, in terms of satisfying a required channel quality metric such as Signal to Interference and Noise Ratio, SINR, or the like. Furthermore, although reference is made herein to changing the coverage provided by a base station, in some embodiments the capacity of the base station is changed, i.e. the number of active terminals changes, for example when terminals which were not previously served are admitted. Thus, the terms "coverage" and "capacity" may be used interchangeably where appropriate.

The condition may comprise one or more of: a number of requests for device-to-device communication received by the in-coverage terminals from the out-of-coverage terminals, a number of the in-coverage terminals that are configured and/or enabled to support direct device-to-device wireless communication, and a number of the in-coverage terminals that have available resources to serve as relays between the particular base station and the out-of-coverage terminals. The condition can therefore serve as an indicator for how to change the coverage. For any of the aforementioned criteria, the number can be one or more than one.

In one embodiment, the method further comprises the particular base station receiving information about the out-of-coverage terminals from the in-coverage terminals. This enables a more informed decision to be made as to how to serve the out-of-coverage terminals.

Changing the coverage may comprise extending the coverage of the serving base station. For example, the coverage of the serving base station can be extended by changing an operating parameter of the serving base station to allow the serving base station to directly communicate with at least one of the out-of-coverage terminals. Alternatively, or additionally, the coverage of the serving base station can be extended by selecting at least one of the in-coverage terminals to serve as a relay between the serving base station and at least one of the out-of-coverage terminals. A base station may therefore serve the out-of-coverage terminal either directly, through a communication path without an intermediary, or indirectly, through a communication path that includes a direct device-to-device communication link. In one embodiment, changing the coverage comprises at least one of: provisioning of a new radio resource to the out-of-coverage terminals, provisioning of an existing radio resource to the out-of-coverage terminals, and using a first radio resource for direct base station to terminal communication and a second radio resource for indirect base station to terminal communication.

In one embodiment, changing the coverage comprises admitting at least one of the out-of-coverage terminals to the system. In another embodiment, changing the coverage comprises handing off at least one of the out-of-coverage terminals to the particular base station from one of the base stations that neighbours the particular base station. Such a neighbouring base station may turn off, or place on stand-by, one or more resources. This allows reduced power consumption by the base station.

The particular base station and the neighbouring base station may share information about the out-of-coverage terminals (which may be in-coverage terminals with respect to the neighbouring base station). The base stations can therefore coordinate in order to ensure that there is no or minimal loss of coverage.

In one embodiment, changing the coverage comprises activating the other base station to provide coverage to at least one of the out-of-coverage terminals. In this way, the activated base station may be used to fill coverage gaps of the base station. The base station may be activated in response to a request or an instruction from at least one of the in-coverage terminals.

In one embodiment, the method further comprises at least one of the in-coverage terminals transmitting a discovery signal indicating that it can serve as a relay between the particular base station and out-of-coverage terminals. This provides a mechanism for in-coverage terminals to advertise their capability to act as relays to out-of-coverage terminals.

The method may further comprise the serving base station scheduling the in-coverage terminal to transmit the discovery signal. This allows the base station retain a degree of control over the transmission of discovery signals.

The in-coverage terminals which transmit the discovery signal may be selected by the serving base station based on a throughput criterion. The throughput criterion can include, for example, one or more of a fill level of a buffer, a SNR, a battery level, and a mobility of the in-coverage terminal. An in-coverage terminal that meets one or more throughput criterion, for example has a low buffer fill level, a high SNR, a high battery level, and/or is substantially stationary, is more likely to be suitable to act as relays for an out-of-coverage terminal.

In one embodiment, the discovery signal is transmitted by the in-coverage terminal using a frequency hopping scheme. This increases the chance of discovery by out-of-coverage terminals that are configured to support relatively narrow and different discovery bandwidths. Alternatively, or in addition, the discovery signal can be transmitted at configurable time intervals, for example at periodic time interval set by the serving base station.

In one embodiment, the length of the periodic time interval is set according to a transmission condition, the transmission condition comprising one or more of: the in-coverage terminal has recently been scheduled to transmit the discovery signal, and an estimated channel quality of the in-coverage terminal is greater than a predetermined threshold. For example, longer time intervals can be set if the in-coverage terminal has recently been scheduled to transmit the discovery signal and/or if the estimated channel quality is greater than the predetermined threshold. In this way, the communication resources can be sparingly used.

In one embodiment, the discovery signal transmitted by the in-coverage terminal indicates a value of a communication parameter offered thereby. This allows an out-of-coverage terminal to judge whether an in-coverage terminal is suitable for its needs.

In one embodiment, the discovery signal is a reference signal. This could be an uplink reference signal such as a sounding reference signal. The discovery signal according to embodiments may be interspersed with regular reference signals such as regular sounding reference signals that are used for channel estimation by the serving base station.

In one embodiment, there is provided a wireless communication system, comprising one or more base stations each configured to provide a corresponding coverage in use, at least one of the base stations configured to: determine whether a condition related to direct device-to-device wireless communication between one or more in-coverage terminals that are within the coverage of the base station and one or more out-of-coverage terminals that are outside the coverage of the base station is satisfied, and change the coverage if the condition is satisfied so as to provide coverage to one or more of the out-of-coverage terminals.

In one embodiment, there is provided a base station for use in a wireless communication system, comprising a communication unit configured to provide coverage to one or more in-coverage terminals; and a controller configured to determine whether a condition related to direct device-to-device wireless communication between the in-coverage terminals and one or more out-of-coverage terminals that are outside of its coverage is satisfied, and to control the communication unit to change the coverage if the condition is satisfied.

In one embodiment, there is provided a terminal for use in a wireless communication system, the wireless communication system comprising one or more base stations each configured to provide a corresponding coverage in use, the terminal comprising a communication unit; and a controller configured to, when the terminal is in the coverage provided by a particular base station, control the communication unit to transmit to the particular base station information about one or more out-of-coverage terminals that is outside the coverage provided by the particular base station In one embodiment, there is provided a method of advertising a relaying capability in a communication system comprising one or more base stations each configured to provide a corresponding coverage in use, a particular one of the base stations providing coverage to one or more in-coverage terminals, there being one or more out-of-coverage terminals outside the coverage provided by the particular base station, the method comprising at least one of the in-coverage terminals transmitting a signal indicating that it can serve as a relay between the serving base station and an out-of-coverage terminal.

One embodiment provides a computer program product comprising computer executable instructions which, when executed by a computer, cause the computer to perform a method as set out above. The computer program product may be embodied in a carrier medium, which may be a storage medium or a signal medium. A storage medium may include optical storage means, or magnetic storage means, or electronic storage means.

Embodiments may be incorporated into a specific hardware device, a general purpose device configured by suitable software, or a combination of both. Aspects can be embodied in a software product, either as a complete software implementation, or as an add-on component for modification or enhancement of existing software (such as a plug in). Such a software product could be embodied in a carrier medium, such as a storage medium (e.g. an optical disk or a mass storage memory such as a FLASH memory) or a signal medium (such as a download). Specific hardware devices suitable for the embodiment could include an application specific device such as an ASIC, an FPGA or a DSP, or other dedicated functional hardware means.

Furthermore, any combinations of the described features, functions and/or operations can be provided.

Additional aspects and/or advantages will be set forth in part in the description which follows and, in part, will be apparent from the description, or may be learned by practice of the invention.

BRIEF DESCRIPTION OF THE DRAWINGS

Specific embodiments will be described in further detail below on the basis of the accompanying drawings, in which.

DETAILED DESCRIPTION

Embodiments can be applied, for example, to wireless communication systems based on the Third Generation Partnership Project (3GPP) Long Term Evolution (LTE) standard, in which base stations are called eNodeBs (eNBs) and terminals are called user equipments (UEs). In order to provide a better understanding of the embodiments, a brief description of a wireless communication system in accordance with the Third Generation Partnership Project (3GPP) Long Term Evolution (LTE) standard is therefore provided below with reference to FIG. 1. However, it should be understood that embodiments can be applied to other wireless communication systems. Thus, the terms "wireless communication system", "base station" and "terminal" used herein are not limited to 3GPP LTE systems, eNBs and UEs.

Figure 1:
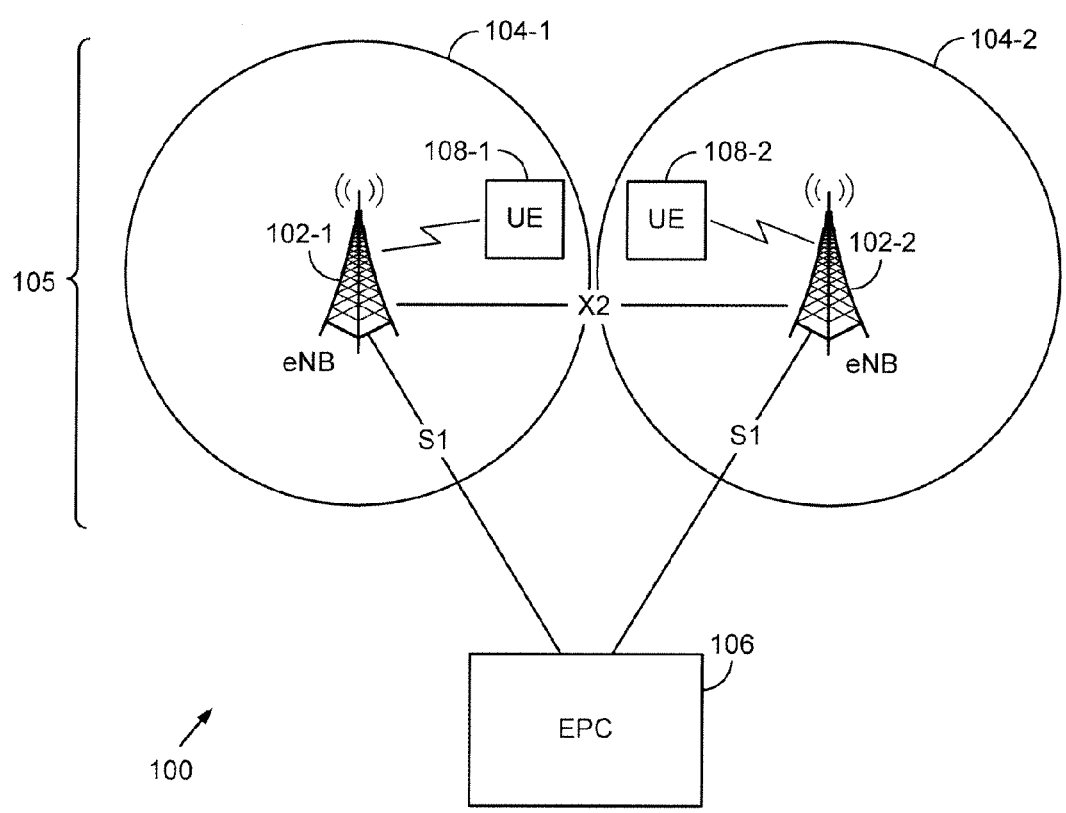
FIG. 1 is a shows a schematic illustration of a LTE wireless communication system.

As shown in FIG. 1, a system 100 in accordance with the 3GPP LTE standard is functionally split between an evolved Universal Terrestrial Radio Access (E-UTRAN) network 105 and an Evolved Packet Core (EPC) 106, which together constitute the Evolved Packet System. As illustrated, the E-UTRAN network 105 comprises eNBs 102-1, 102-2 interconnected to each other by means of an X2 interface. The eNBs 102-1, 102-2 are also connected to the EPC by means of S1 interfaces. The EPC 106 includes (not shown) the Serving Gateway, the Mobility Management Entity, the Packet Data Network Gateway, and the Policy Charging Rules Function. As noted above, the eNBs 102-1, 102-2 provide the radio interface toward UEs 108-1, 108-2 in the respective coverages 104-1, 104-2. In FIG. 1, the coverages are represented as circles, though it will be appreciated that in practice the coverage typically does not have a regular shape (whether circular, hexagonal, or otherwise).

Typically, when UEs 108-1, 108-2 communicate with each other they do so via their serving eNB 102-1, 102-2. However, 3GPP has recently started studying the use of licensed spectrum for direct, peer-to-peer communication between UEs. Discovery and communications between UEs that are in proximity is studied under the general umbrella of Proximity Services, also often referred to as device-to-device (D2D) communication. In this context, proximity is determined ("A UE is in proximity of another UE") when a proximity criterion or criteria are fulfilled. Proximity criteria can be different for discovery and communication. Examples of the criteria include, for example, communication range, channel conditions, and achievable QoS. For further details, the reader is referred to 3GPP TR 22.803, "3rd Generation Partnership Project; Technical Specification Group Services and System Aspects; Feasibility study for Proximity Services (ProSe)" (Release 12), which is herein incorporated by reference in its entirety.

Changing Coverage of a Base Station

Figure 2A:
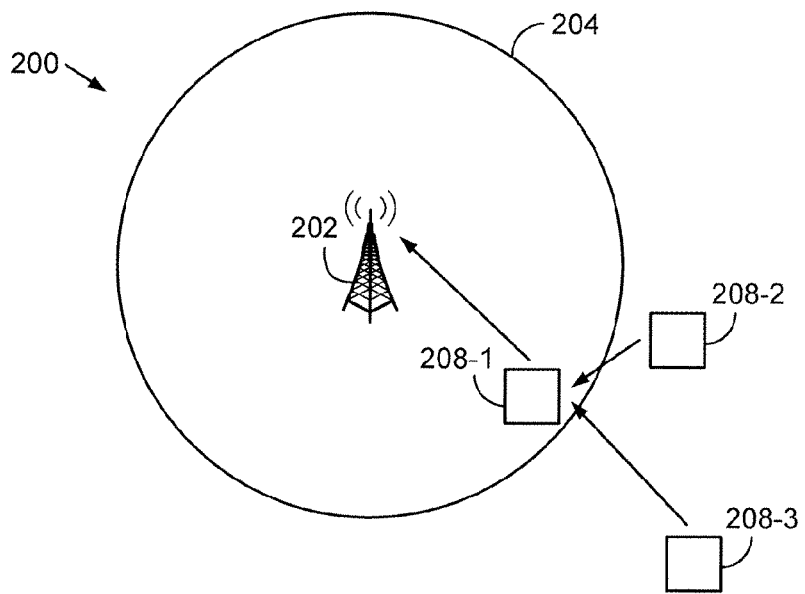
FIGS. 2A and 2B schematically show how coverage of a base station can be changed, according to an embodiment.
Figure 2B:
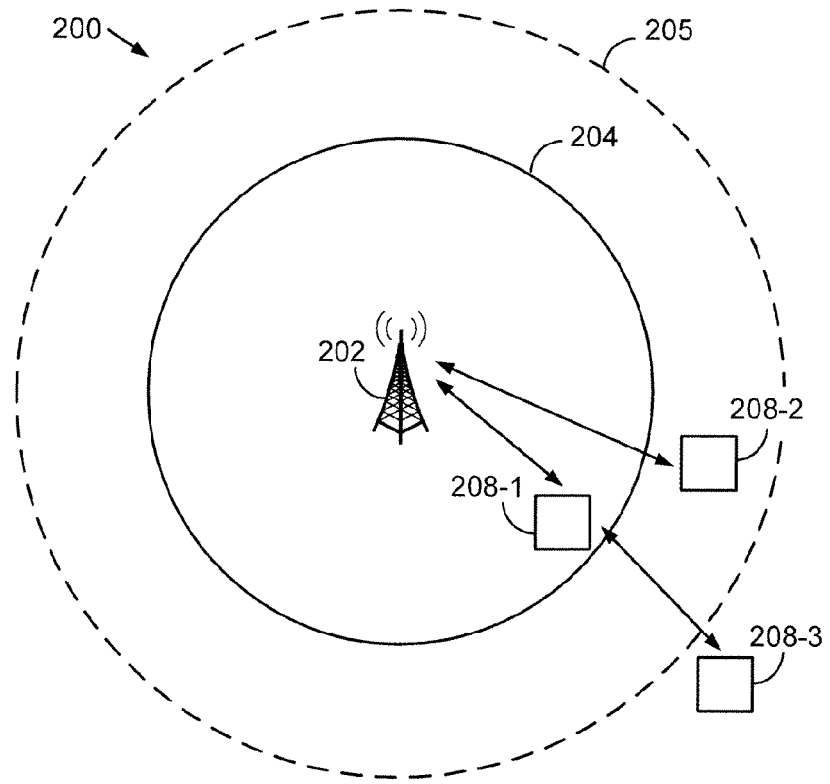

FIGS. 2a and 2b schematically show how coverage of a base station can be changed, according to an embodiment.

A wireless communication system 200 comprises base station 202 with coverage 204. As noted previously, "coverage" (or "coverage area") herein denotes a communication capability between a base station and a terminal. For convenience, the term coverage will simply be used.

As illustrated in FIG. 2a, terminal 208-1 is within the coverage 204 of the base station 202 and will therefore be referred to as an in-coverage terminal, while terminals 208-2, 208-3 are outside the coverage 204 of the base station 202 and will therefore be referred to as out-of-coverage terminals. Here, the terminal 208-1 is located at the edge of the coverage 204 provided by base station 202. Each of the terminals 208-2, 208-3 is assumed to be in proximity of terminal 208-1. The ways in which the UEs can discover that they are in proximity may be conventional and will therefore not be discussed here. As noted above, proximity may defined in terms of, for example, a geographical location, a communication range, a channel condition, or an achievable QoS.

Figure 3:
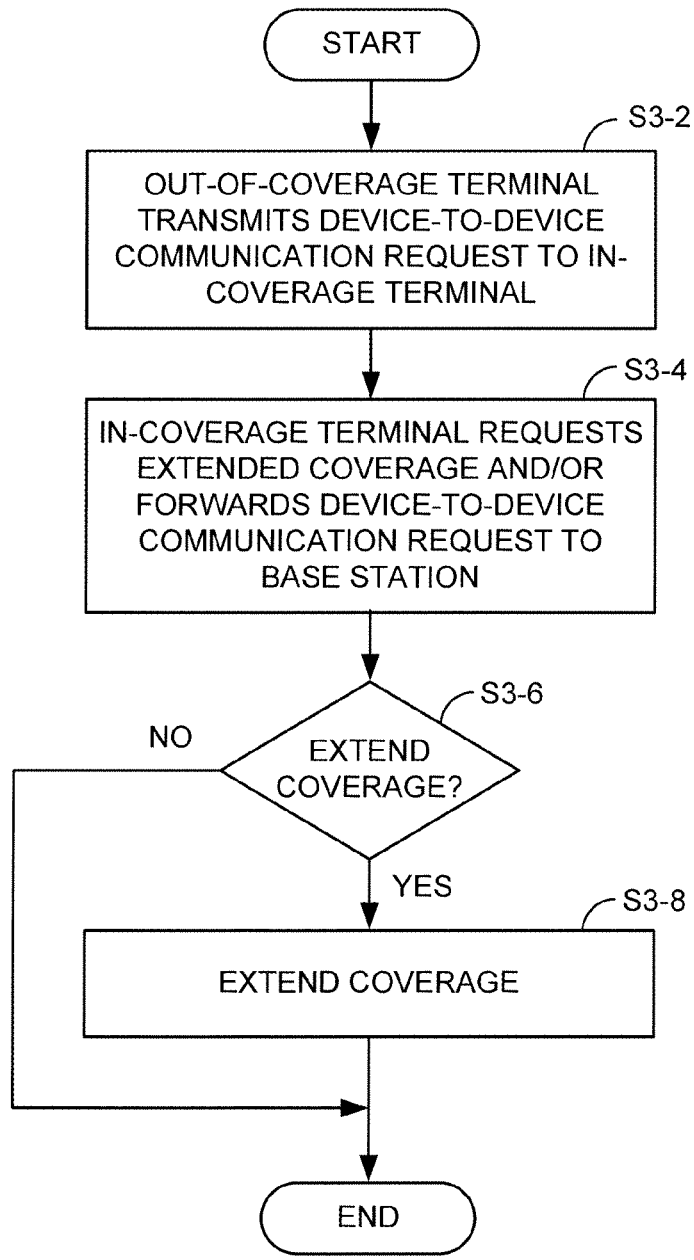
FIG. 3 is a flow diagram showing steps of a method of changing coverage of a base station, according to an embodiment.

With reference now also to FIG. 3, which is a flow chart showing steps of a method of changing coverage of a base station. The method begins with the out-of-coverage terminal transmitting a request to establish a D2D link to the in-coverage terminal (e.g., terminal 208-1) (step S3-2). Such a request can be made, for example, when an out-of-coverage terminal has data to be transmitted or requires a service. The in-coverage terminal then requests its serving base station (e.g., base station 202) for extended coverage and/or forwards the received D2D request to the base station (step S3-4). The base station then decides whether or not to extend the coverage (step S3-6) and, if the decision is affirmative, extends the coverage (step S3-8).

The decision to extend the coverage may be based, for example, on a number of D2D requests exceeding a certain threshold. The number of D2D requests may therefore relate to a total number of requests, a total number of requests received from a particular in-coverage terminal (which may indicate that a number of out-of-coverage terminals are located in a particular area), and so on. Furthermore, to aid the base station in making the decision, the out-of-coverage and/or in-coverage terminals may provide information such as channel measurements, buffer status, and QoS requirements.

In embodiments, the coverage may be extended by the use of in-coverage terminals as relay terminals and/or by changing an operating parameter of the base station to extend the coverage within which a direct communication path between the base station and terminal can be established.

The use of in-coverage terminals as relay terminals will be discussed in more detail later, though it is briefly mentioned that terminals which can support higher throughput are generally more suitable to serve as relay terminals.

Herein, the term "operating parameter" refers to any parameter that can be set by the base station in order to affect its coverage, whether hardware, firmware, software, or any combination thereof. Thus, changing an operating parameter of the base station, may include, for example:

increasing the transmit power, possibly taking into account increased interference this may cause. For example, interference protection between CDMA cells offered by the use of scrambling codes is not available in narrowband OFDMA transmissions, which leaves the narrowband signals vulnerable to narrowband interference. However, the ability of cells to coordinate their narrowband scheduling offers some potential for interference avoidance. Support for coordination of resource block (RB) allocation between cells in the downlink was introduced in Release 8 with the inclusion of the relative narrowband transmit power (RNTP) indicator. This support feature is a bitmap that can be shared between base stations over the X2 interface. It represents those RB for which the base station intends to limit its output power to a configurable upper limit for some period of agree-upon time;

switching to different, for example lower, carrier frequencies;

using a lower Modulation and Coding Scheme (MCS), provided inter-cell interference is low; and/or changing antenna tilt.

In this disclosure, the coverage depicted by a dashed line represents the extended coverage within which a direct communication path between the base station and terminal can be established. For reasons of clarity, the extended coverage provided by the use of relay terminals is not depicted. Furthermore, the coverage depicted by the solid and dashed lines are shown as omnidirectional coverage, though it will be understood that either or both of the coverage could alternatively be directional, e.g. subdivided into different sectors (sectorized). This means that the coverage of one or more sectors can be selectively extended, for example to provide coverage for a number of out-of-coverage terminals are located in a particular area.

Accordingly, as shown in FIG. 2b, terminal 208-3 may communicate with base station 202 via a D2D link to (relay) terminal 208-1, while terminal 208-2 becomes a "regular" terminal served by the base station 202 within the extended coverage 205. Alternatively, or additionally, depending on network and/or device conditions for example, the terminal 208-2 may communicate with base station 202 via a D2D link to terminal 208-1.

In order to employ D2D links, embodiments may make use of mechanisms such as advertising and establishing the D2D link. These mechanisms by themselves may be conventional, except as described herein, and are therefore not described in more detail herein except as may be necessary or helpful in understanding the embodiments. (However, one embodiment which will be described in more detail later proposes a design for how D2D-capable devices (which can act as relays for out-of-coverage devices) can advertise this capability, for example by the use of a beacon-like signal.) Further, the skilled person will be aware of how the spectrum (time and frequency) resources may be shared between the D2D links and "regular" (terminal-to-access point) links within a single cell, and no further mention will be made.

Changing Coverage of Multiple Base Stations

The principles described above can equally be applied to a wireless communication system having a plurality of neighbouring base stations. The terms "out-of-coverage terminal" and "in-coverage terminal" are generally defined with respect to one of the base stations, that is whether a terminal is outside of or within the coverage of that base station. Also, where the wireless communication system is a wireless cellular communication system, the base station may be referred to as a "cell-site", the coverages of base stations may be referred to as "cells" and a terminal at the edge of the coverage may be referred to as a "cell-edge terminal".

Thus, the method described with FIG. 3 can be adapted to such a case. For example, the decision to extend the coverage of a base station may take into account whether changing an operating parameter such as increasing transmission power would result in unacceptable interference to a neighbouring coverage and, if so, whether it is possible to extend the coverage by using an in-coverage terminal as a relay terminal instead.

In embodiments, terminals served by a lightly-loaded base station are handed off to a neighbouring base station and the lightly-loaded base station is switched off, as described in more detail below.

Figure 4A:
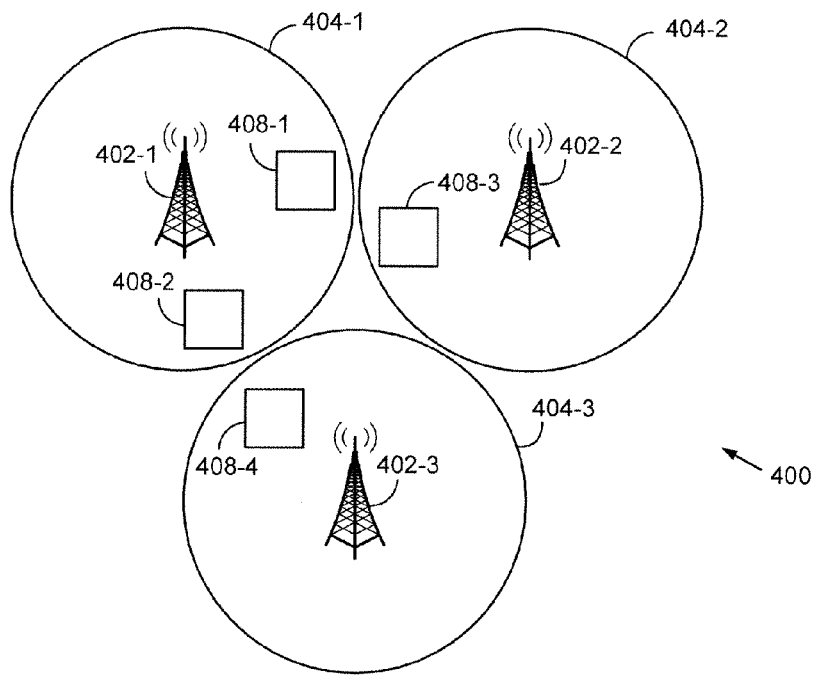
FIGS. 4A and 4B schematically show how coverage of base stations of a wireless communication system can be changed, according to an embodiment.

FIG. 4a schematically shows a wireless cellular communication system 400 comprising a plurality of neighbouring base stations 402-1, 402-2, 402-3, each providing a respective coverage 404-1, 404-2, 404-3. Although three base stations are depicted in this example, it will be appreciated that the wireless communication system may have fewer or more than three base stations. Furthermore, the coverages 404-1, 404-2, 404-3 of the base stations 402-1, 402-2, 402-3 may overlap with one another.

In this example, it is assumed that the base station 402-1 is a lightly-loaded base station and that the terminals 408-1, 408-2 are cell-edge terminals representing the vast majority, if not all, of the terminals served by the base station 402-1. Here, the coverage of the wireless communication system 400 is changed by switching off the lightly-loaded base station 402-1 and extending the coverage of base stations 402-2, 404-3, to which the terminals 408-1, 408-2 are handed off.

Figure 4B:
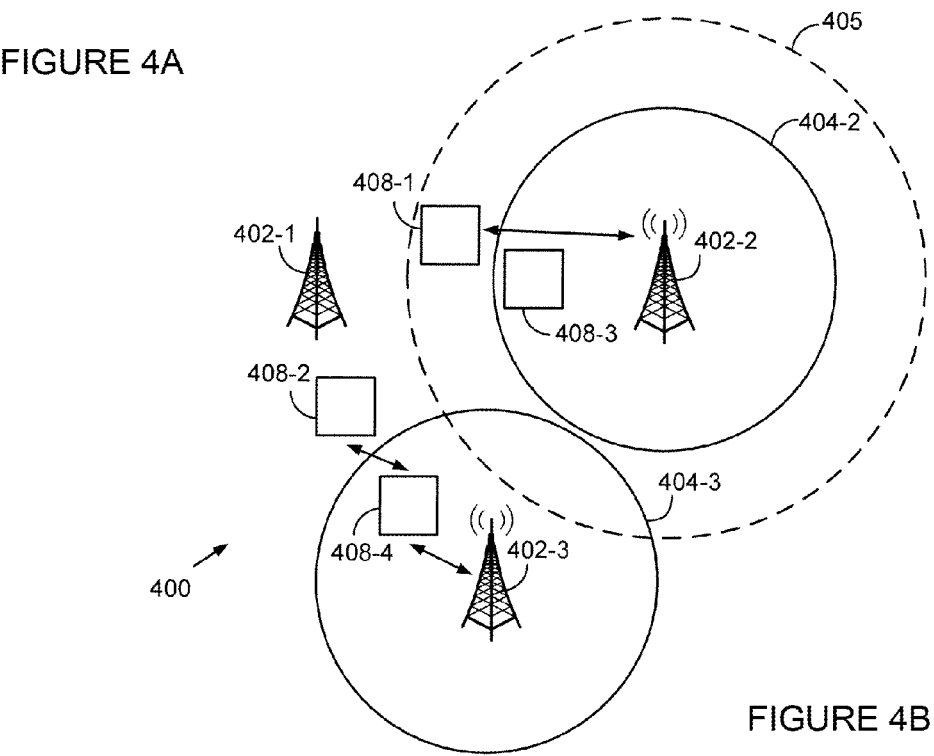
Figure 5:
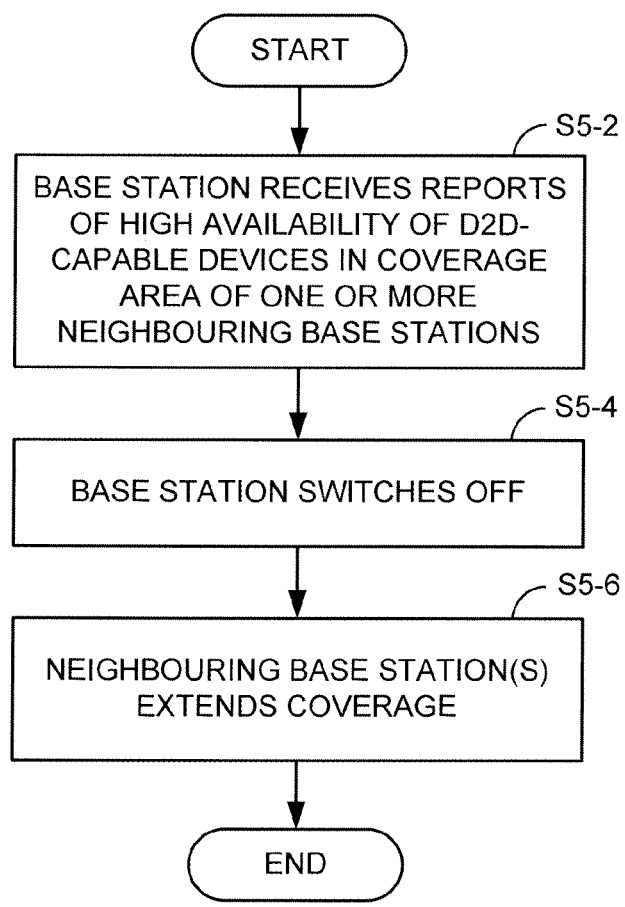
FIG. 5 is a flow diagram showing steps of a method of changing coverage of base stations of a wireless communication system, in accordance with one embodiment FIGS. 6A and 6B schematically show how coverage of a base station can be changed, according to an embodiment.

Referring now also to FIGS. 4b and 5, terminals 408-1, 408-2 report high availability of D2D-capable terminals 408-3, 408-4 within the coverage of the neighbouring base stations 404-2, 404-3 to base station 402-1 (step S5-2). Using these reports as a trigger the base station 402-1 is switched off (step S5-4), and the terminals 408-1, 408-2 handed off to the neighbouring base stations 404-2, 404-3 (step S5-6). The decision to switch off may be based on the number of reports exceeding a threshold. In some embodiments, the terminals 408-3, 408-4 are relied upon to act as relays between terminals 408-1, 408-2 and base stations 402-2, 402-3, respectively. That is, the coverage of the base stations 402-2, 402-3 may initially be extended by employing the terminals 408-3, 408-4 as relays, and thereafter one or both of the base stations 402-2, 402-3 may change an operating parameter to allow direct communication with the terminals 408-1, 408-2. However, this need not be the case, and one or both of the base stations 402-2, 402-3 could provide direct coverage initially, for example increasing the transmit power based on an estimated interference. It will be understood that terminals 408-1, 408-2 may be handed off to neighbouring base stations 404-2, 404-3 before, or substantially at the same time as, the base station 402-1 is switched off. Thus, steps S5-4 and S5-6 may be exchanged or combined.

The decision to switch off the lightly-loaded base station 402-1 may involve coordination between the base stations 402-1, 402-2, 402-3. For example, the reported information may be shared with the neighbouring base stations 402-2, 402-3, for example using the X2 interface (not shown). This may be used by the neighbouring base stations 402-2, 402-3, possibly in conjunction with additional information, to determine whether to switch off the lightly-loaded base station 402-1 and/or how best to serve the terminals 408-1, 408-2. The additional information can include, for example, the transmit power of the terminals 408-1, 408-2, traffic load of the neighbouring base stations 402-2, 402-3, whether frequency resources made available once the light-loaded base station 402-1 is switched off are "better" used for D2D communications or for extending the coverage, as well as whether some terminals are left out of coverage by this switch-off, which may be unacceptable.

Changing Coverage by Activating a Base Station

In embodiments, a base station is activated to fill coverage gaps identified by D2D requests made by out-of-coverage terminals.

Figure 6A:
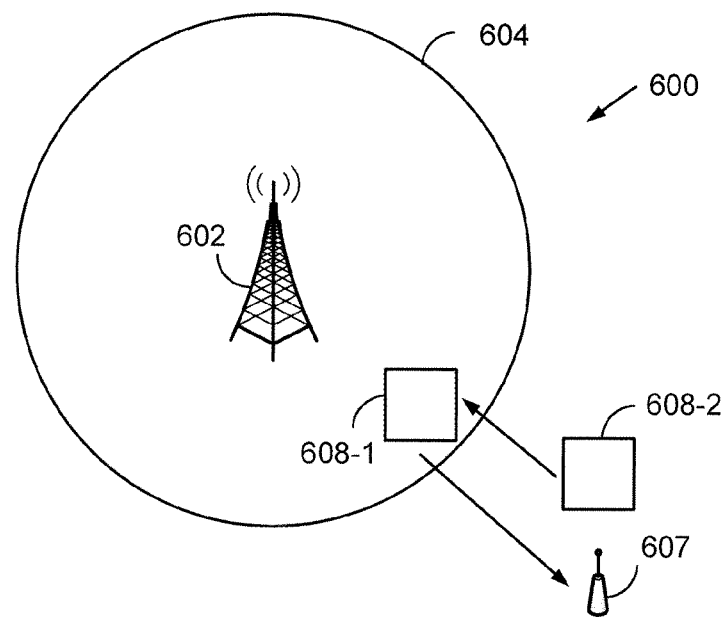

FIG. 6a schematically shows a wireless communication system 600 comprising a base station 602-1, with an in-coverage terminal 606-1 that is within the coverage 604-1 of the base station 602 and an out-of-coverage terminal 608-2 that is outside of the coverage 604 of the base station 602. The system 600 also comprises a femtocell base station 607. The term "wireless communication system" may therefore refer to infrastructure nodes of a plurality, and in some cases different types, of networks available to terminals, such as an eNB of a LTE cellular network and an access point of a WiFi network. The manner in which terminals served by different network operators may co-operate, for example by sharing a database to facilitate associating terminals with multiple networks, are not described in more detail herein.

Figure 6B:
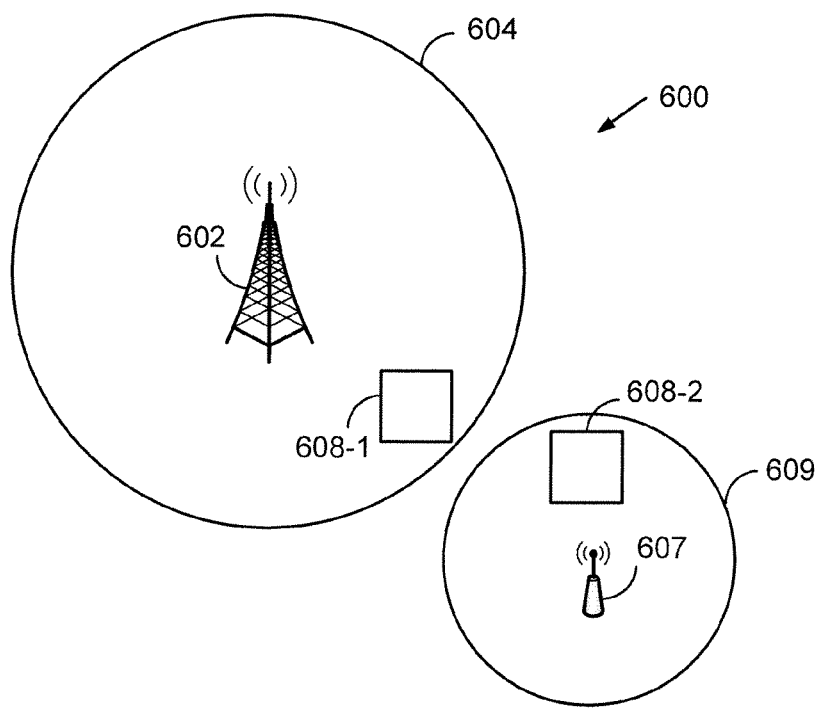

Terminal 608-2, which could be one of many out-of-coverage terminals, requests D2D communication with terminal 608-1, which similarly could be one of many in-coverage terminals. In response, the terminal 608-2 activates femtocell base station 607, for example by instructing or requesting the femtocell base station 607 for radio resources for terminal 608-2. In one embodiment, a decision to activate the femtocell base station 607 is based on the number of terminals requesting D2D communications that are located within the coverage 609 of the femtocell base station 607 once it is activated, as shown in FIG. 6b. The coverage 609 may overlap with the coverage 604 of base station 602.

Provisioning Radio Resources Amongst Terminals

Figure 7A:
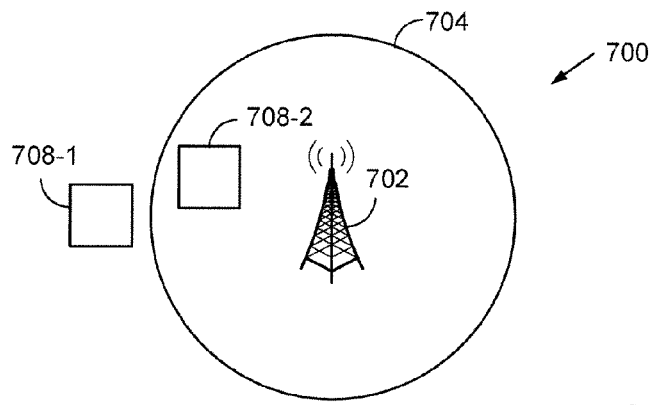
FIGS. 7A and 7B schematically show how coverage of a base station can be changed, according to an embodiment.
Figure 7B:
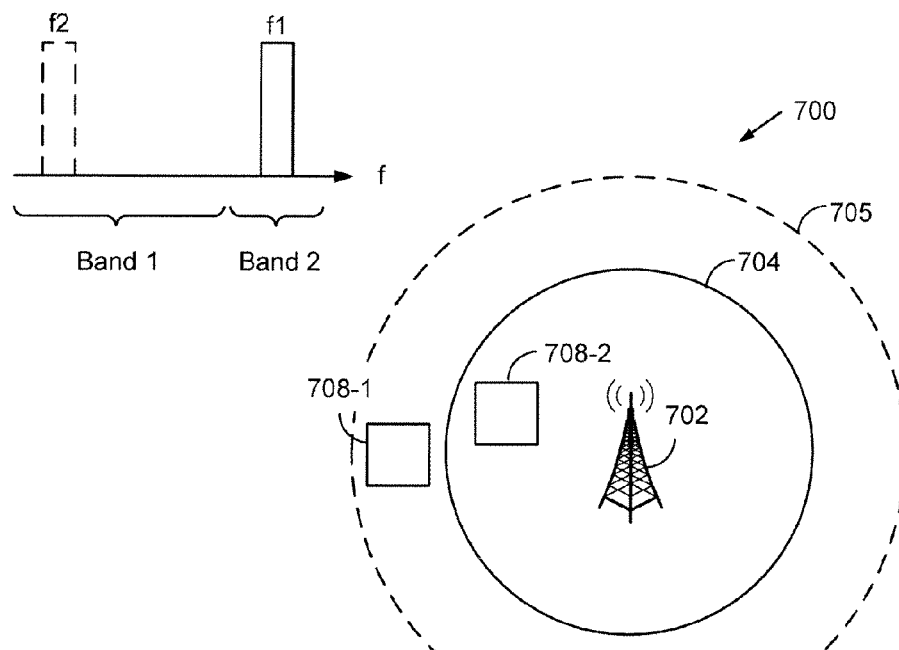

In embodiments, a change in coverage includes coordinating the usage of radio resources amongst in-coverage and out-of-coverage terminals. In general terms this can include provisioning a new radio resource to out-of-coverage terminals and/or provisioning an existing radio resource to out-of-coverage terminals. An existing radio resource may be a radio resource that is provisioned for use by in-coverage terminals, such as an existing radio resource that is under-used or not used at all. For example, as shown in FIGS. 7a and 7b, when an in-coverage terminal 708-2 receives a D2D request from out-of-coverage terminal 708-1, the base station 702 can be informed accordingly, in a similar manner to that of the embodiment described with reference to FIGS. 2a and 2b. The base station 702 then provisions a radio resource to the out-of-coverage terminal 708-1. Furthermore, different radio resources may be provisioned for direct and indirect communications between base station 702 and terminals 708-1, 708-2.

In embodiments, the coverage of a base station is extended by increasing the transmission bandwidth to serve coverage gaps identified by D2D requests, for example using LTE Advanced (LTE-A) carrier aggregation (CA), a brief description of which follows below.

CA increases the overall transmission bandwidth by utilising more than one carrier, and can be used for both frequency division duplex (FDD) and time division duplex (TDD). Each aggregated carrier is referred to as a component carrier. In LTE-A, the component carrier can have a bandwidth of 1.4, 3, 5, 10, 15 or 20 MHz and a maximum of five component carriers can be aggregated. Hence the maximum bandwidth is 100 MHz. The number of aggregated carriers can be different in uplink (UL) and downlink (DL), however the number of UL component carriers is never larger than the number of DL component carriers. The individual component carriers can also be of different bandwidths. One way to arrange aggregation is to use contiguous component carriers within the same operating frequency band (as defined for LTE). This is referred to as intra-band contiguous. Another way to arrange aggregation is to use non-contiguous allocation, which can be either intra-band or it inter-band. For intra-band, the component carriers belong to the same operating frequency band, but are separated by a frequency gap. For inter-band, the component carriers belong to different operating frequency bands.

In CA, the component carriers are referred to as the primary component carrier (PCC) (a downlink primary component carrier and an associated uplink primary component carrier, DL and UL PCC) and the secondary component carrier (SCC) (all other component carriers). Also, a cell served by the PCC is referred to as a primary service cell and a cell served by the SCC is referred to as the secondary serving cell. The coverage of the primary and secondary serving cells may differ, both due component carrier frequencies but also from power planning. Furthermore, different terminals may use different carriers, with the configuration of the primary component carrier being terminal specific and determined according to the loading on the various carriers as well as other relevant parameters. In addition, the association between the downlink primary carrier and the corresponding uplink primary component carrier is cell specific.

Thus, in some embodiments, the coverage 704 defines a primary service cell and the extended coverage 705 defines a secondary service cell. Component carriers f1, f2 can be used to communicate with terminal 708-2, whereas terminal 708-1 is not within the coverage of component carrier f1, but is in the coverage of component carrier f2. Alternatively, terminal 708-1 can be excluded from using component carrier f1, so that the in-coverage and out-of-coverage terminals 708-1, 708-2 use separate component carriers.

Signalling of Relay Capability

In the previously described embodiments, in-coverage terminals may be employed as relay terminals for out-of-coverage terminals. One embodiment provides a mechanism for enabling the in-coverage terminals to advertise their capability to serve as a relay terminal using D2D links. In particular, in-coverage terminals may use a beacon-like signal, such as a modified UL Sounding Reference Signals (SRS) of LTE-A.

By way of background, 3GPP LTE provides two types of uplink reference signals. The first type of reference signal is the Demodulation Reference Signal (DM-RS), which is used for channel estimation in the eNB in order to demodulate control and data channels. The second type of reference signal is the SRS, which is primarily used to provide uplink channel quality information to enable scheduling decisions in the base station. The subframes in which SRSs are transmitted by any UE within a cell are indicated by cell-specific broadcast signalling: a 4-bit cell-specific 'srsSubframeConfiguration' parameter indicates 15 possible sets of subframes in which SRS may be transmitted within each radio frame. In addition, the SRS can be switched off completely in the cell. The SRS transmissions are in the last Single Carrier Frequency Division Multiple Access (SC-FDMA) symbol in the configured subframes. The eNB in LTE may either request an individual SRS transmission from a UE or configure a UE to transmit SRS periodically until terminated; a 1-bit UE-specific signalling parameter, 'duration', indicates whether the request SRS transmission is single or periodic. If periodic SRS transmissions are configured for a UE, the periodicity may be any of 2, 5, 10, 20, 40, 80, 160 or 320 ms; the SRS subframe offset within the period in which the UE should transmit its SRS are configured by a 10-bit UE-specific dedicated signalling parameter called 'srs-ConfigIndex'. Here, the above-described SRS signals will be referred to as the "normal" SRS signals.

In embodiments, in addition to the normal UL SRS that are regularly sent by D2D-capable terminals during normal operation, such terminals may also send a specially coded SRS every N (configurable) seconds to enable discovery by other terminals. This is of particular use to out-of-coverage terminals. The periodicity can be signalled by increasing the number of bits currently used for the srsSubframeConfiguration parameter in order to indicate that this is a special SRS for D2D-capable terminal discovery. It is also possible to keep the normal number of bits for the srsSubframeConfiguration parameter, but in this case it may be necessary to send multiple instances of the srsSubframeConfiguration parameter, e.g. the first instance indicating the periodicity of the normal SRS and the second instance indicating the periodicity of the special SRS.

The parameter N can be made higher for recently scheduled terminals and/or those terminals whose channel does not vary significantly as the UL channel quality estimation does not need to be carried out frequently in those cases and therefore some SRS slots can be sacrificed for D2D capability advertising. This specifically coded SRS need not support high sounding bandwidth as it is not used (solely) for its primary purpose—but in that case the neighbouring devices in search of a D2D partner may need to know which frequencies to scan for this specially coded SRS.

If this frequency is not fixed the bandwidth of the specially coded SRS could change in a frequency hopping manner to increase the changes of being received by a device wishing to establish a D2D connection and/or to spread the chances of discovery across a wide number of devices configured to support relatively narrow and different discovery bandwidths. If these devices however support a wide discovery bandwidth then the sub-band selected for the special SRS could indicate a value of a certain parameter, such as supported throughput on the D2D link, or the QoS that could be offered.

In embodiments, a terminal that can support higher throughput (and is thus more suitable to act as relays for another terminal's traffic), may be selected if, for example, the terminal exhibits a low buffer level, a high signal-to-noise ratio (SNR), a high battery level, low mobility (i.e. is relatively stationary), or any combination thereof. These may be reported to a base station. Thus, in embodiments, the modification of SRS is such that the eNB only configures this new SRS for those UEs which can exhibits one or more of these characteristics.

Device Structure

Figure 8:
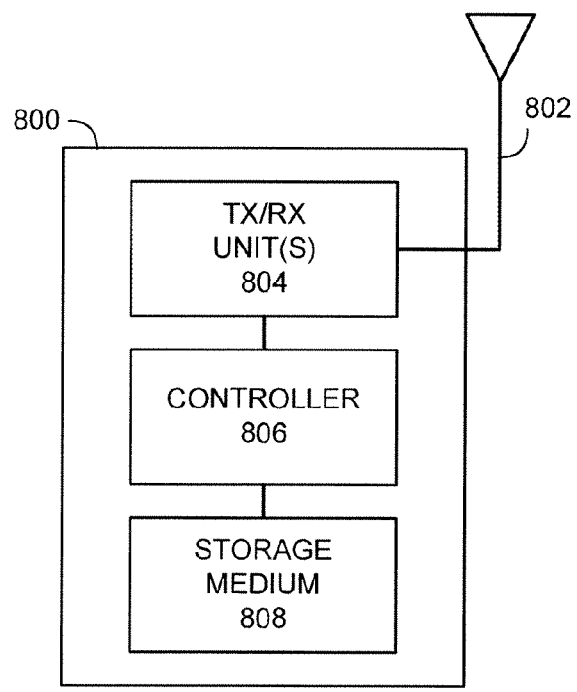
FIG. 8 is a schematic block diagram of a base station, in accordance with an embodiment.

FIG. 8 is a block diagram illustrating an example of a base station 800 in accordance with an embodiment. The base station includes transmitter/receiver unit(s) 804 connected to at least one antenna 802 (together defining a communication unit) and a controller 804. The controller may be, for example, microprocessor, digital signal processor (DSP), ASIC, FPGA, or other logic circuitry programmed or otherwise configured to perform the various functions described above, such as changing an operating parameter of the base station 800. For example, the various functions described above may be embodied in the form of a computer program stored in the storage medium 808 and executed by the controller 804.

Figure 9:
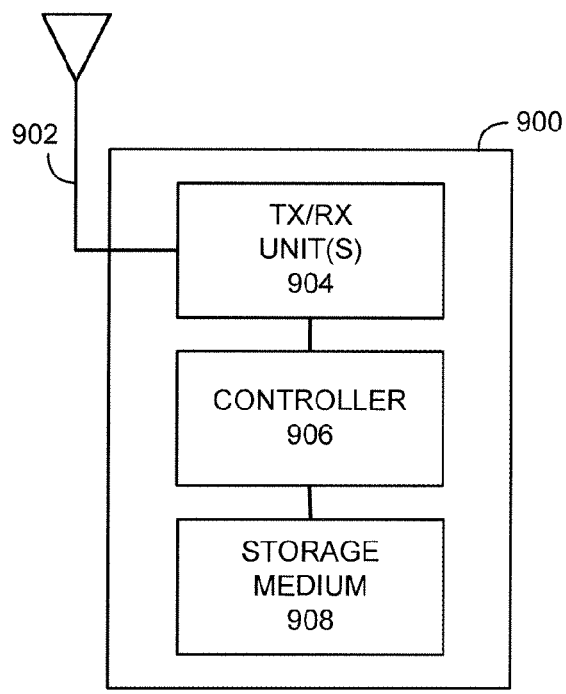
FIG. 9 is a schematic block diagram of a terminal, in accordance with an embodiment.

FIG. 9 is a block diagram illustrating an example of a terminal 900 in accordance with an embodiment. The terminal 900 may include any type of device which may be used in a wireless communication system described above and may include cellular (or cell) phones (including smartphones), personal digital assistants (PDAs) with mobile communication capabilities, laptops or computer systems with mobile communication components, and/or any device that is operable to communicate wirelessly. The terminal 900 include transmitter/receiver unit(s) 904 connected to at least one antenna 802 (together defining a communication unit) and a controller 904. The controller may be, for example, microprocessor, digital signal processor (DSP), ASIC, FPGA, or other logic circuitry programmed or otherwise configured to perform the various functions described above, such as controlling the communication unit to transmit a SRS signal. For example, the various functions described above may be embodied in the form of a computer program stored in the storage medium 808 and executed by the controller 804.

Although embodiments have been described in the context of 3GPP LTE, other protocols can be used, including for example other protocols of the 3GPP family of standards such as GSM, GPRS and UMTS, as well as WiMAX (IEEE802.16), CDMA and WiFi (IEEE802.11).

Embodiments have been described in which a modified UL Sounding Reference Signals (SRS) of LTE-A is used to advertise a capability of terminal to serve as a relay terminal using D2D links. Other UL signalling could alternatively be used, such as a modified Random Access Channel (RACH), where either the first or subsequent messages contain coded information which relates to the indication that apply to that case the neighbouring devices can access this device via a D2D link. In this case, the RACH behaviour could be modified such that, instead of conventional event triggered by RACH, the RACH is sent with a defined repetition frequency. When using the contention-free RACH, for example, a D2D-capable terminal is assigned a dedicated preamble to be used to indicate its D2D/relaying capability. This preamble is transmitted periodically in the Physical Random Access Channel (PRACH). A terminal needing a D2D connection monitors PRACH for the specific dedicated preamble(s) and then in a hand-shaking procedure replies using the same preamble.

In embodiments, coverage is changed by switching off the base station. Alternatively, the base station may be placed on stand-by. Furthermore, one or more base station resources, including hardware resources and radio resources (e.g. frequency and/or time resource), may be selectively switched off or placed on stand-by.

Embodiments have been described in which the coverage is changed when an out-of-coverage terminal having data to be transmitted or requires a service. However, in other embodiments, the coverage may be changed when the system has data to transmit to an out-of-coverage terminal. In such embodiments, device-to-device communication between the in-coverage and out-of-coverage terminals can be used to page an out-of-coverage terminal.

It will be understood that, in general, base stations with coverages of various orders of magnitude may be employed, including macrocell base stations, microcell base stations, picocell base stations, femtocell base stations, or any combinations thereof. Examples include, for example, eNBs, Home eNBs and Wi-Fi access points. The coverage of the base station may be larger than the coverage of the activated base station, which may be used to fill coverage gaps. For example, the base station could be a macrocell base station and the activated base station could be a femtocell base station.

While certain embodiments have been described, these embodiments have been presented by way of example only and are not intended to limit the scope of the inventions. Indeed, the devices, methods, and products described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A method of operating a wireless communication system comprising one or more base stations each configured to provide a corresponding coverage in use, a particular base station of the one of the base stations providing coverage to one or more in-coverage terminals, there being one or more out-of-coverage terminals outside the coverage provided by the particular base station, the method comprising:

receiving, by the particular base station from the one or more in-coverage terminals, information about a number of requests for direct device-to-device wireless communication received by the one or more in-coverage terminals from the one or more out-of-coverage terminals;

determining, by the particular base station, whether the number of requests exceeds a threshold; and if the number of requests exceeds the threshold, changing at least one of the coverage of the particular base station and the coverage of another one of the one or more base stations, so as to provide coverage to the one or more of out-of-coverage terminals.

2. The method according to claim 1, wherein said changing is further dependent on one or more of:

a number of the one or more in-coverage terminals that are configured and/or enabled to support direct device-to-device wireless communication, and a number of the one or more in-coverage terminals that have available resources to serve as relays between the particular base station and the one or more out-of-coverage terminals.

3. The method according to claim 1, wherein changing the coverage comprises at least one of: provisioning of a new radio resource to the one or more out-of-coverage terminals, provisioning of an existing radio resource to the one or more out-of-coverage terminals, and using a first radio resource for direct base station to terminal communication and a second radio resource for indirect base station to terminal communication.

4. The method according to claim 1, wherein changing the coverage comprises admitting at least one of the one or more out-of-coverage terminals to the system.

5. The method according to claim 1, wherein changing the coverage comprises handing off at least one of the one or more out-of-coverage terminals to the particular base station from the one or more base stations that neighbours the particular base station, preferably the particular base station and the neighbouring base station sharing information about the one or more out-of-coverage terminals.

6. The method according to claim 1, wherein changing the coverage comprises activating the other base station to provide coverage to at least one of the out-of-coverage terminals, for example in response to a request or an instruction from at least one of the in-coverage terminals.

7. The method according to claim 1, further comprising at least one of the one or more in-coverage terminals transmitting a discovery signal indicating that it can serve as a relay between the particular base station and the one or more out-of-coverage terminals.

8. The method according to claim 7, further comprising the particular base station scheduling said at least one of the one or more in-coverage terminals to transmit the discovery signal, and/or further comprising the particular base station selecting said at least one of the one or more in-coverage terminals based on a throughput criterion.

9. The method according to claim 7, wherein the discovery signal is transmitted by the one or more in-coverage terminal in accordance with a periodic time interval set by the particular base station, preferably the length of the periodic time interval being set according to a transmission condition, the transmission condition comprising one or more of: the one or more in-coverage terminal has recently been scheduled to transmit the discovery signal, and an estimated channel quality of the one or more in-coverage terminal is greater than a predetermined threshold.

10. The method according to claim 7, wherein the discovery signal transmitted by said at least one of the one or more in-coverage terminals indicates a value of a communication parameter offered thereby.

11. The method according to claim 7, wherein the discovery signal comprises a reference signal, preferably an uplink reference signal such as a sounding reference signal.

12. A wireless communication system, comprising:

one or more base stations each configured to, in use, provide a corresponding coverage, wherein at least one of the one or more base stations is configured to, when the at least one base station is providing coverage to one or more in-coverage terminals and there are one or more out-of-coverage terminals outside the coverage provided by the at least one base station:

receive, from the one or more in-coverage terminals that are within the coverage of the at least one base station, information about a number of requests for direct device-to-device wireless communication received by the one or more in-coverage terminals from the one or more out-of-coverage terminals, determine whether the number of requests exceeds a threshold, and change the coverage if the number of requests exceeds the threshold so as to provide coverage to the one or more of the out-of-coverage terminals.

13. A base station for use in a wireless communication system, comprising:

a transmitter and a receiver configured to provide coverage to one or more in-coverage terminals; and a microprocessor configured to, when the base station is providing coverage to the one or more in-coverage terminals and there are one or more out-of-coverage terminals outside the coverage provided by the base station:

receive, from the one or more in-coverage terminals, information about a number of requests for direct device-to-device wireless communication received by the one or more in-coverage terminals from the out-of-coverage terminals, determine whether the number of requests exceeds a threshold, and if the number of requests exceeds the threshold, then control the transmitter and receiver to change the coverage so as to provide coverage to one or more of the out-of-coverage terminals.

* * * * *